United States Patent [19]

Seki et al.

[11] Patent Number: 5,162,953
[45] Date of Patent: Nov. 10, 1992

[54] DIGITAL SIGNAL REPRODUCING APPARATUS

[75] Inventors: Takahito Seki, Kanagawa; Hajime Inoue, Tokyo, both of Japan

[73] Assignee: Sony Corporation, Tokyo, Japan

[21] Appl. No.: 524,439

[22] Filed: May 17, 1990

[30] Foreign Application Priority Data

May 19, 1989 [JP] Japan .................... 1-127561

[51] Int. Cl.$^5$ .............................................. G11B 5/09
[52] U.S. Cl. ..................................................... 360/32
[58] Field of Search ................ 360/32, 36.2, 8, 64, 360/9.1

[56] References Cited

U.S. PATENT DOCUMENTS 4,660,103  4/1987  Wilkinson et al. ................ 360/36.2
4,791,498 12/1988  Yoshihiro ............................. 360/36.2

Primary Examiner—Vincent P. Canney
Attorney, Agent, or Firm—Hill, Van Santen, Steadman & Simpson

[57] ABSTRACT

A digital signal reproducing apparatus wherein an analog signal corresponding to stored digital data is processed to generate a digital data signal including an analog-to-digital converter operative to convert the analog signal to a digital signal, a decoder to decode the digital signal, and a memory interposed between the analog-to-digital converter and digital decoder to remove time base components from the digital signal. The analog signal is converted to the digital signal and the digital signal is read into the memory at a first clock rate. The digital signal is read out from the memory and subsequently decoded at a second clock rate.

14 Claims, 2 Drawing Sheets

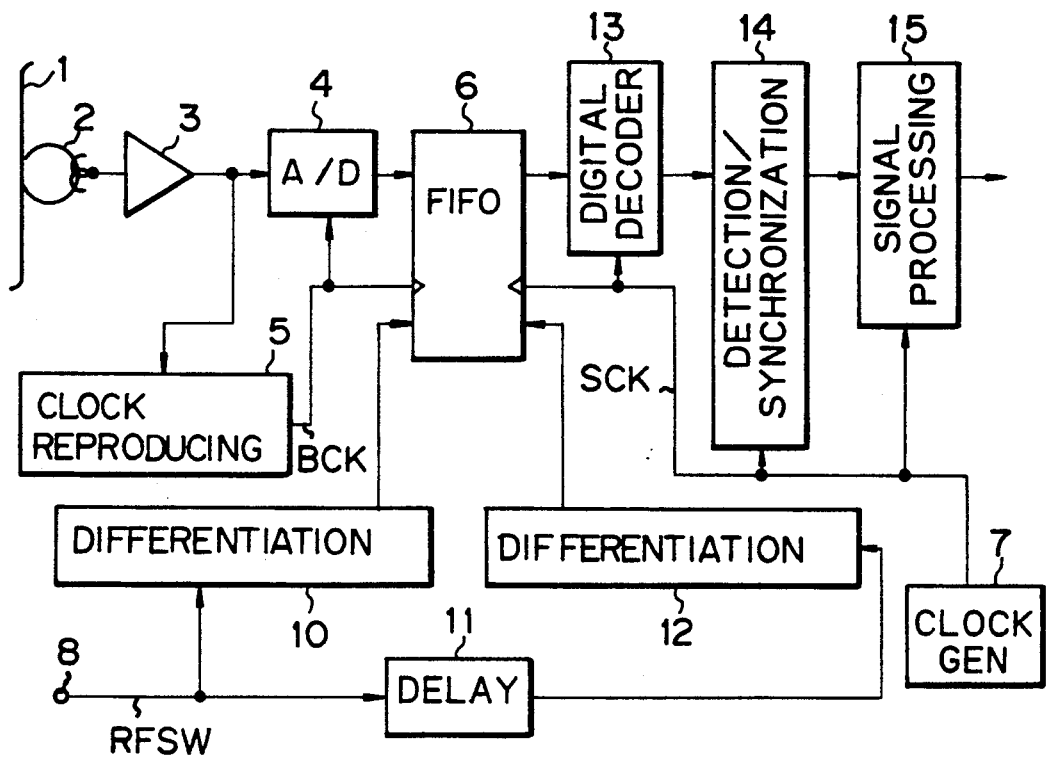
Fig. 3
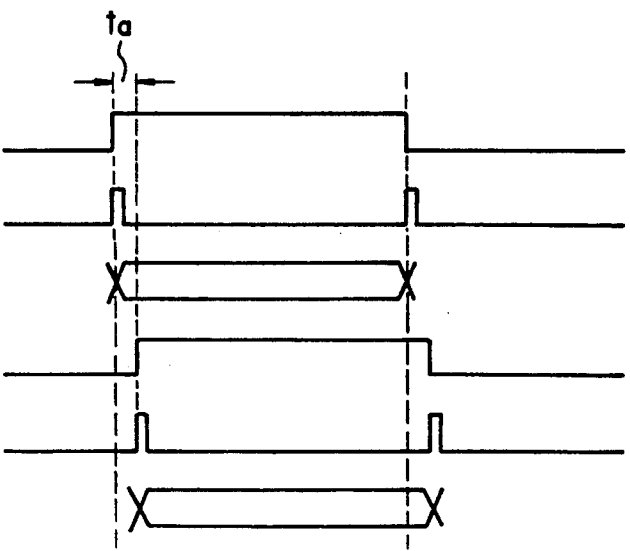
Fig. 4A
Fig. 4B
Fig. 4C
Fig. 4D
Fig. 4E
Fig. 4F

DIGITAL SIGNAL REPRODUCING APPARATUS

BACKGROUND OF THE INVENTION

The invention relates to digital signal reproducing apparatus. More particularly, the invention relates to a digital signal reproducing apparatus suitable for use in decoding a digital signal generated by a playback head in, for example, a digital video tape recorder (VTR).

In a digital VTR, direct current (DC) components in recorded digital data used by a playback head (hereinafter referred to as the "reproduced signal") to generate a corresponding signal can be lost because of a differential characteristic of the tape-and-head system. For this reason a decoding circuit is used in a reproducing radio frequency (RF) circuit of the digital VTR (hereinafter referred to as the "reproducing RF circuit") to restore the lost DC components while decoding a digital video signal stored on the tape.

In FIG. 1 there is illustrated a conventional reproducing RF circuit of a digital VTR. As illustrated, a digital signal recorded on a tape 51 is reproduced by a head 52, i.e., a representative electrical signal is generated by the head 52 in view of a sensed magnetic signal. The signal on the tape 51 can be quantitized by, for example, eight (8) bits. The reproduced signal is supplied to an analog decoding circuit via an amplifier 53 (hereinafter a "reproducing amplifier").

The analog decoding circuit 54 decodes the reproduced signal and generates a digital video signal. However, because of a differential characteristic of the tape-and-head system (i.e., tape 51 and head 52), DC components can be lost in the reproduced signal. To compensate for this loss of the DC components, after high frequency components in the reproduced signal are reinforced by the analog decoding circuit 54, the reproduced signal is integrated. By integrating the reproduced signal, the DC components are restored. Thus, the digital video signal represents a decoded version of the original signal on the tape 51.

As further illustrated in FIG. 1, the digital video signal is supplied to a time base variable component (TBC) circuit 57 via a data latch 56. In parallel, the amplified reproduced signal is supplied from the reproducing amplifier 52 to another input of the TBC circuit 57 via a clock reproducing circuit 55. The TBC circuit 57 is used to eliminate time base variable components in the reproduced signal.

The clock reproducing circuit 55 serves to generate a bit clock signal BCK11 from the reproduced signal. It is this signal BCK11 that is supplied to the TBC circuit 57. Additionally, the bit clock signal BCK 11 is supplied to the data latch 56.

In view of the bit clock signal BCK11 supplied thereto, the data latch 56 latches the output of the decoding circuit 54 in synchronization with the bit clock signal BCK11. Similarly, the digital video signal is clocked into a memory of the TBC circuit 57 at a rate determined by the bit clock signal BCK11.

The TBC circuit 57 is also supplied with an additional reference clock signal SCK11 that is generated by a reference clock 59. The TBC circuit 57 thus can eliminate time-base variable components in the reproduced signal because the digital video signal latched into the memory of the TBC circuit 57 is read out with a timing based on the reference clock signal SCK11.

The TBC circuit 57 also is capable of detecting a sync pattern in the reproduced signal. This sync pattern is used to determine a conversion rate for converting serial data to parallel data.

An output of the TBC circuit 57 is supplied to a signal processing circuit 58. The signal processing circuit 58 is also supplied with the reference clock signal SCK11 by the reference clock generating circuit 59. The circuit 58 then performs conventional signal processing in view of the reference clock signal SCK11.

The conventional reproducing RF circuit just described in which the decoding circuit 54 is used in the form of an analog circuit, is influenced by, for example, temperature changes. As a result, the operation of the reproducing RF circuit of FIG. 1 is unstable.

To overcome this instability problem, another circuit arrangement has been employed. This circuit arrangement is illustrated in FIG. 2.

In the circuit arrangement of FIG. 2, instead of using the analog decoder 54, the reproduced signal is first converted to a digital signal via an A/D converter 60, and then the digital signal is decoded by a digital decoder 61. In this manner, the influence of temperature is eliminated because the digital signal and digital circuits will not be as easily influenced by changes in temperature.

Because the reproduced signal includes time base components which are subject to A/D conversion by the A/D converter 60, high speed circuit components must be used. Each time base component must be identified for A/D conversion or it could be lost. To this end, high speed components such as ECL, etc. must be used in the digital decoding circuit 61, in view of the time base variation.

However, use of such high speed components in the digital decoding circuit 61 requires large scale technology wherein power consumption is greater. Further, use of such high-speed components can increase manufacturing costs.

SUMMARY OF THE INVENTION

The invention provides an improved digital signal reproducing apparatus. To this end, the invention provides a digital signal reproducing apparatus including a digital decoding circuit that can be constructed without using high-speed circuit components. As a result, the scale, power consumption, and manufacturing costs of the digital signal reproducing apparatus can be minimized.

In one embodiment, the invention provides a digital signal reproducing apparatus comprising:

an A/D converter that converts a reproduced signal derived from digital data stored on a recording medium to a digital signal at a rate determined by a first clock signal;

a digital decoder that decodes the digital signal to produce a digital data signal; and a memory interposed between the A/D converter and the digital decoder for eliminating time-base variable components of the reproduced signal by receiving the digital signal at a rate determined by the first clock signal and by supplying the digital signal to the digital decoder at a rate determined by a reference clock signal.

In a particular embodiment, the memory comprises a first-in-first-out (FIFO) register.

An advantage of the invention is that since the digital decoder is operated at a rate determined by the reference clock signal, which does not include time-base variable components, high-speed electronic devices need not be used in the digital decoder.

These and other features and advantages of the invention will become apparent from the following detailed description of the presently preferred embodiments and accompanying drawings.

BRIEF DESCRIPTION OF THE DRAWINGS

FIG. 3 is a block diagram of a new digital signal reproducing apparatus principles of the invention.

FIGS. 4A-4F are timing charts of signals used in the apparatus of FIG. 3.

DETAILED DESCRIPTION OF THE PRESENTLY PREFERRED EMBODIMENTS

Figure 1:
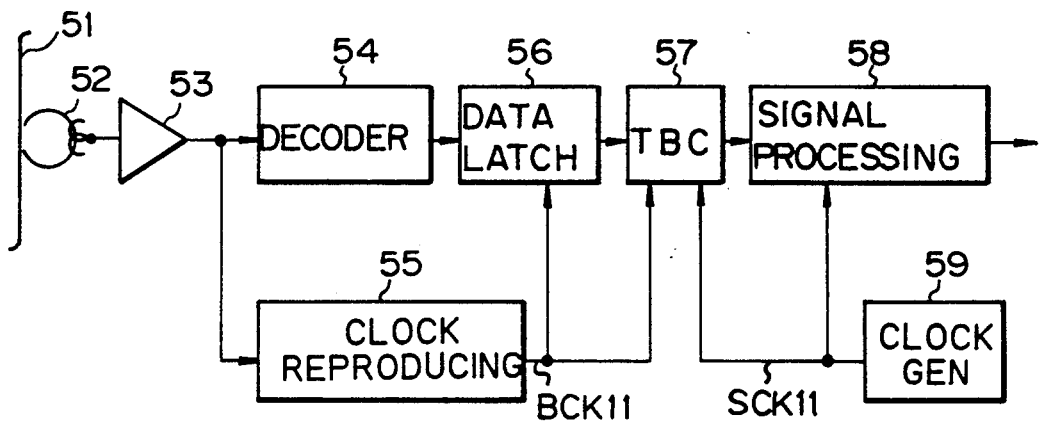
FIG. 1 illustrates a conventional digital signal reproducing apparatus in block diagram form.
Figure 2:
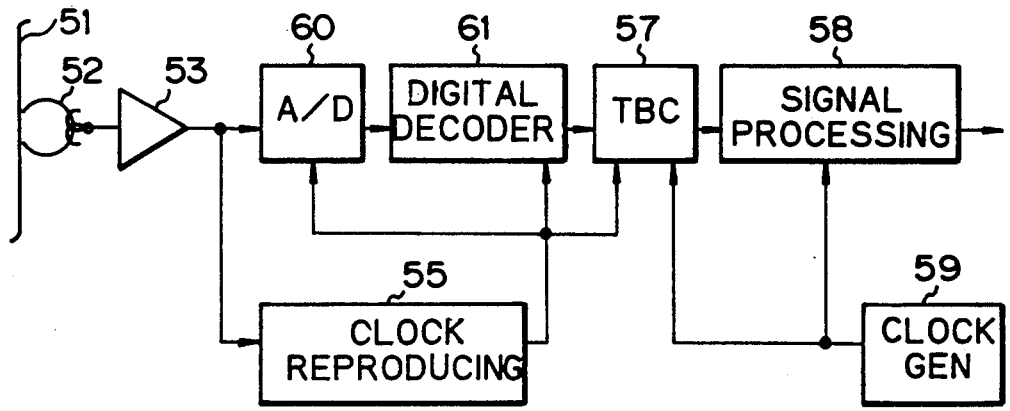
FIG. 2 illustrates another conventional digital signal reproducing apparatus in block diagram form.

In FIG. 3, an embodiment of the invention is illustrated. As can be seen, data recorded on a tape 1, such as a video tape, is sensed and reproduced by a tape head 2 as an electrical signal hereinafter referred to as the reproduced signal.

The reproduced signal is supplied to an A/D converter 4 via an amplifier 3, hereinafter referred as the reproducing amplifier 3. Simultaneously, the reproduced signal is supplied from the reproducing amplifier 3 to a clock reproducing circuit 5. The clock reproducing circuit 5 generates a clocking signal referred to as the reproducing bit clock signal BCK.

The reproducing bit clock signal BCK is also supplied to the A/D converter 4 to provide a clocking signal for clocking data into the A/D converter 4. Thus, at a rate determined by the reproducing bit clock signal BCK, the amplified reproduced signal is converted into a digital signal.

The digital signal output of the A/D converter is supplied to a memory 6, preferably a first-in, first-out (FIFO) register. The FIFO register 6 is supplied with the reproducing bit clock signal BCK which determines the rate at which the digital signal output of the A/D converter is written into the FIFO register 6. The FIFO register 6 is also provided with a reference clock signal SCK generated by a reference clock circuit 7. The reference clock signal SCK controls the rate at which the digital signal is read out of the FIFO register 6.

Further, the FIFO register 6 is also provided with an input reset pulse signal and an output reset pulse signal. These reset pulse signals are generated from a tape head switching signal RFSW provided at terminal 8. The input reset pulse signal is generated by a differentiating circuit 10 whose output is coupled to the FIFO register 6. The output reset pulse signal is generated by another differentiating circuit 12 after the tape head switching signal is subjected to a delay via a delay circuit 11.

FIG. 4A illustrates a timing diagram for the tape head switching signal RFSW. FIG. 4B illustrates a timing diagram for the input reset pulse signal provided to the FIFO register 6. FIG. 4C illustrates a timing diagram for the reproducing bit clock signal BCK. FIG. 4D illustrates a timing diagram for the tape head switching signal RFSW after being subjected to a delay. FIG. 4E illustrates a timing diagram for the output reset pulse signal provided to the FIFO register 6. FIG. 4F illustrates a timing diagram for the reference clock signal SCK.

As illustrated in FIGS. 4A-4F, the tape head switching signal RFSW comprises a step function. Whenever the tape head switching signal RFSW transitions, i.e., at the appearance of the leading or trailing edge thereof, an input reset pulse signal is generated by the differentiating circuit 10 and provided to the FIFO register 6 (FIG. 4B). Thus, whenever the tape head switching signal RFSW transitions, the input buffer of the FIFO register 6 is reset. At that time, the individual data of the digital signal output of the A/D converter 4 are sequentially written into the FIFO register 6 in synchronization with the reproducing bit clock signal BCK (FIG. 4C).

The delay of the tape head switching signal RFSW induced by the delay circuit 11 as it is supplied to the differentiating circuit 12 is illustrated in FIG. 4D. As illustrated, the delay circuit 11 includes a delay of time ta in the tape head switching signal RFSW.

As illustrated in FIG. 4E, in a manner similar to that of the input reset pulse signal, the output reset pulse signal provided to the output of the FIFO register 6 is generated at each transition of the delayed tape head switching signal RFSW. Thus, an output reset pulse signal is generated by the differentiating circuit 12 a time period ta after generation of an input reset pulse signal by the differentiating circuit 10.

As illustrated in FIG. 3, the digital signal written into the FIFO register 6 is read out from the FIFO register 6 in synchronization with a reference clock signal SCK. The reference clock signal SCK is appropriately generated by a reference clock generator 7. Because of the use of different clock signals for reading the digital signal into and out from the FIFO register 6, time base variable components in the reproduced signal are eliminated. The digital signal output from the FIFO register 6 are supplied to a decoding circuit 13.

As noted above, due to a differential characteristic of the tape-and-head system, low frequency components in the reproduced signal can be lost. However, these low frequency reproduced signal can be lost. However, these low frequency components are restored by the digital decoding circuit 13 in the manner as is known in the art.

The digital decoding circuit 13 is clocked by the reference clock signal SCK generated by the reference clock signal generated circuit 7. Since the digital decoding circuit 13 is operated at a rate determined by the reference clock signal SCK that is free of time-base variation, high speed circuit components need not be used to construct the digital decoding circuit 13.

The output of the digital decoding 14 is referred to as a digital data signal and is supplied to a sync pattern detecting and byte synchronizing circuit 14 which converts the data in the digital data signal from serial form to parallel data form. The conversion is made in view of a detected sync pattern.

An output of the sync pattern detecting and synchronizing circuit 14 is supplied to a signal processing circuit 15 for processing in the manner known in the art. The signal processing circuit is also supplied with the reference clock signal SCK from the reference clock signal generating circuit 7.

In the above-discussed embodiment, the case where a digital video signal is reproduced is explained. However, this invention is not so limited. The invention can be widely applied to, e.g., the cases where various digital signals are reproduced.

Further, the above-discussed embodiment concerns a case where data recorded on a magnetic tape is reproduced. However, the invention is not limited to the use of magnetic tape. This invention can be widely applied to other recording media, e.g., a magnetic reproducing apparatus using a magnetic recording medium.

As discussed, according to the invention, time-base variable components in the reproduced signal are eliminated by the FIFO register 6 before the reproduced signal is decoded by the digital decoding circuit 13, and the digital decoding circuit 13 is operated based on the reference clock SCK which does not include time-base variable components. In this fashion, according to the invention, since the digital decoding circuit 13 operates with the reference clock SCK free of time-base variable components, a digital decoding circuit using high-speed devices need not be used as the digital decoding circuit 13. Therefore, it is possible to reduce the scale of the circuit, decrease its power consumption and decrease its manufacturing cost.

While a preferred embodiment has been shown, modifications and changes may become apparent to those skilled in the art which shall fall within the spirit and scope of the invention. It is intended that such modifications and changes be covered by the attached claims.

We claim:

1. A digital signal reproducing apparatus comprising:
    reproducer means for reproducing a digital signal recorded on a recording medium by generating an analog signal at an output thereof;
    A/D-converting means for converting said analog signal at said output of said reproducer means into an intermediate digital signal at an A/D output at a rate determined by a first clock signal;
    memory means for eliminating time-base error components of said reproduced signal having an input connected to said A/D output to receive said intermediate digital signal at said rate determined by said first clock signal and an output operative to supply said intermediate digital signal at a rate determined by a second clock signal; and
    decoding means for decoding an output of said memory means at said rate determined by said second clock signal thereby to obtain a digital signal which reproduces said digital signal; recorded on said recording medium.

2. The digital signal reproducing apparatus of claim 1, wherein said memory means is reset in response to a head switching signal.

3. The digital signal reproducing apparatus of claim 1, wherein said memory means comprises a first-in-first-out register.

4. The digital signal reproducing apparatus of claim 1, wherein said memory means input and output are resettable and said apparatus includes means for applying a first reset signal to said memory means input and means for applying a second reset signal to said memory means output in time delayed fashion relative to said first reset signal.

5. A digital signal reproducing apparatus, comprising:
    a device that generates an analog signal corresponding to a stored digital signal;
    an analog-to-digital converter operative to convert said analog signal corresponding to said stored digital signal into an intermediate digital signal at an A/D output at a rate determined by a first clock signal;
    a memory having an input connected to said A/D output to receive said intermediate digital signal at said rate determined by said first clock signal and an output operative to supply said intermediate digital signal at a rate determined by a second clock signal; and
    a decoder operative to decide said intermediate digital signal supplied by said memory at a rate determined by said second clock signal to thereby generate a digital data signal which is a reproduction of said stored digital signal.

6. The digital signal reproducing apparatus of claim 5, wherein said memory comprises a first-in-first-out register.

7. The digital signal reproducing apparatus of claim 5, wherein said first clock signal comprises a clock rate derived from said information contained in said analog signal.

8. The digital signal reproducing apparatus of claim 5, wherein said second clock signal comprises a reference clock signal generated by a reference clock generator.

9. The digital signal reproducing apparatus of claim 5, wherein said memory input and said memory output are resettable via reset signals applied thereto, and said digital signal reproducing apparatus includes a first circuit operative to generate a first reset signal for said memory input and a second circuit operative to generate a second reset signal for said memory output in time delayed fashion relative to said first reset signal.

10. A method for reproducing a digital signal comprising the steps of:
    generating an analog signal corresponding to a digital signal stored in a recording medium;
    converting said analog signal into an intermediate digital signal in a converter at a rate determined by a first clock signal;
    supplying said intermediate digital signal from said converter to a memory;
    storing said intermediate digital signal in said memory at said rate determined by a second clock signal; and
    decoding said intermediate signal read out from said memory at said rate determined by said second clock signal to produce a digital data signal which reproduces said digital signal stored in said recording medium.

11. The method of claim 10, wherein said first clock signal comprises a clock signal based on information contained in said analog signal.

12. The method of claim 10, wherein said second clock signal comprises a reference clock signal.

13. The method of claim 10, wherein said memory is a first-in-first-out register.

14. A digital signal reproducing apparatus comprising an analog-to-digital converter operative to convert an analog signal corresponding to digital data into an intermediate digital signal at an A/D output; a digital decoder operative to decode said intermediate digital signal; and a memory interposed between said analog-to-digital converter and said digital decoder, said memory having an A/D input connected to said A/D output to receive said intermediate digital signal from said analog-to-digital converter at a first clock rate and to supply said intermediate digital signal to said digital decoder at a second clock rate.

* * * * *